Jan. 22, 1935.                J. F. KOVALSKY                1,988,658
                              CONTROL APPARATUS
                              Filed May 27, 1933

WITNESSES:
Leon J. Jaza
Hymen Diamond

INVENTOR
Joseph F. Kovalsky.
BY
F. W. Lyle
ATTORNEY

Patented Jan. 22, 1935

1,988,658

UNITED STATES PATENT OFFICE 1,988,658

CONTROL APPARATUS

Joseph F. Kovalsky, Turtle Creek, Pa., assignor to Westinghouse Electric & Manufacturing Company, East Pittsburgh, Pa., a corporation of Pennsylvania Application May 27, 1933, Serial No. 673,230

6 Claims. (Cl. 250—41.5)

My invention relates to control apparatus and it has particular relation to apparatus of the type incorporating electric discharge devices.

The present application is a continuation in part of my application Serial No. 525,803, filed March 27, 1931 and assigned to the Westinghouse Electric & Manufacturing Company.

It is an object of my invention to provide control apparatus for varying the condition of a system in accordance with variations in certain of its properties.

Another object of my invention is to provide apparatus for controlling the condition of one or more of the properties of a system by intermittently supplying energy thereto, of a type that shall operate to interrupt the supply of control energy when the contrivance responsive to the property of the system that is to be controlled becomes defective in its operation.

A further object of my invention is to provide apparatus, for supplying energy to vary the properties of a system of a type that shall operate to interrupt the supply of energy when the device responsive to the controlling property of the system in accordance with the response of which the supply of energy is varied, becomes incapacitated.

Still another object of my invention is to provide for control apparatus, of the type incorporating an instrument responsive to a predetermined property of the system and an electric discharge device normally maintained in energized condition but deenergized when the response of the instrument attains a predetermined value, for controlling the supply of power to the system a contrivance for deenergizing the electric discharge device when the instrument is incapacitated.

A still further object of my invention is to provide control apparatus for uniformly supplying energy to a system to be controlled.

An additional object of my invention is to provide apparatus for supplying control energy to a system in response to variations in one of its properties by the operation of which the interruption or the initiation of the supply of the control energy shall take place continuously and not abruptly.

An incidental object of my invention is to provide temperature control apparatus of a type wherein the supply of heat when interrupted or initiated shall be decreased or increased continuously from zero to its maximum value.

Another incidental object of my invention is to provide for temperature control apparatus of the type incorporating an instrument responsive to temperature variations and a relay system responsive to the condition of the instrument for initiating or interrupting the supply of heat energy that shall operate to automatically interrupt the supply of heat energy when the instrument is incapacitated.

More concisely stated, it is an object of my invention to provide apparatus for controlling the supply of energy to a system to be controlled by the operation of which the tendency to overshoot by reason of abrupt variations in the supply of energy to the system shall be suppressed and the danger of destruction of the system by over-supply of energy when the element responsive to the property of the system to be controlled is incapacitated, shall be eliminated.

According to my invention, I provide a control system particularly adapted for controlling the temperature of a region such as a furnace, for example. In this system the heating element of the region is supplied with energy through an electric discharge device of the gas-filled type. The operation of the electric discharge device is controlled by a second electric discharge device also of the gas-filled type and preferably of the grid-glow type.

The excitation of the latter electric discharge device is regulated from a photo-sensitive device coupled between its control electrode and one of its principal electrodes. The photo-sensitive device is normally maintained energized and, in turn, maintains the electric discharge device to which it is coupled in energized condition. An instrument equipped with a movable element is so positioned relative to the photo-sensitive device that the movable element is capable of moving into the path of the beam whereby the photo-sensitive device is energized. The energizing element of the instrument is supplied with energy by a contrivance such as a thermo-couple, the output of which is responsive to the temperature of the region to be controlled.

When the temperature of the region is at so low a value that the movable element of the instrument is below a predetermined point, the photo-sensitive device is energized and the heating element of the region is maintained in energized condition to raise the temperature of the region. On the other hand, when the temperature of the region attains a predetermined value, the photo-sensitive device is deenergized and the heating element for the region is correspondingly deenergized.

The instrument responsive to the temperature variations in the region is equipped with a contact coupled to the grid circuit of the electric discharge device to which the photo-sensitive device is coupled. The movable element of the instrument is also coupled to the control circuit and when the motivating element of the instrument is incapacitated, as for example, by reason of the fact that the temperature responsive element is burned out, the movable element of the instrument engages the contact and the electric discharge device is deenergized.

The smooth supply of power to the heating system is insured by the operation of the circuit associated with the electric discharge device to which the photo-sensitive device is coupled. This circuit provides for combined phase-shift and magnitude variation of the control potential as the illumination impinging on the photo-sensitive device is varied. By reason of the combined phase-shift and magnitude variation in the control potentials of the electric discharge device, the variation in the current ouput of the electric discharge device is continuous during transition periods and the consequent variation of the output of the electric discharge device that feeds the heating elements directly is correspondingly continuous.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1:
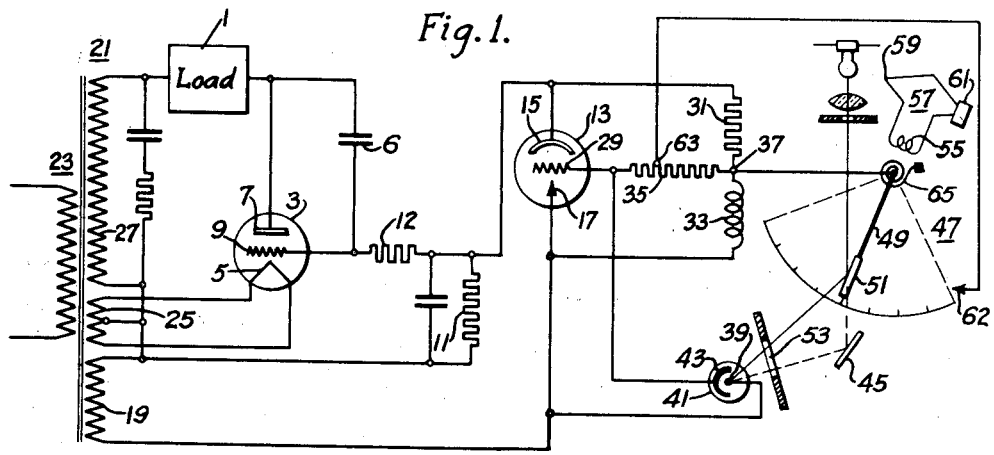
Figure 1 is a diagrammatic view showing the principal elements of a control system constructed in accordance with my invention.

The apparatus shown in Fig. 1 comprises a load 1, which may be the heating element of a region, the temperature of which is to be controlled. The load 1 is energized from a power source (not shown) through an electric discharge device 3 preferably of the gas-filled type and preferably of the type incorporating an excitable or hot cathode 5. A capacitor 6 is connected between the anode 7 and the control electrode 9, of the electric discharge device 3 and a resistor 11 is connected in series with a second resistor 12 of considerably larger magnitude between the cathode 5 and the control electrode 9 of the device.

The former resistor 11 is connected in the principal circuit of a second electric discharge device 13, preferably of the gas-filled type and preferably incorporating a cold cathode 15. The cathode 15 of the cold cathode electric discharge device 13 is connected to the cathode 5 of the hot cathode electric discharge device 3 and the anode 17 of the cold cathode electric discharge device 13 is connected to the control electrode 9 of the hot cathode electric discharge device 3 through the resistor 12 that is of considerable magnitude. The cold cathode electric discharge device 13 is energized from a section 19 of the secondary 21 of the power supply transformer 23 while the hot cathode electric discharge device 3 is energized from independent sections 25 and 27 of the secondary 21.

It is seen that as the current output of the cold cathode electric discharge device 13 is transmitted through the resistor 11 in its principal circuit and the potential impressed between the cathode 5 and the control electrode 9 of the hot cathode electric discharge device is varied in accordance with the output of the cold cathode electric discharge device. The variation of the output of the hot cathode electric discharge device 3 is not simply dependent upon the magnitude of the potential impressed between its cathode 5 and its control electrode 9 but is dependent on the phase relationship between the control potential and the principal potential. The potential impressed across the capacitor 6 connected in the control circuit of the hot cathode electric discharge device 3 is substantially in time quadrature with the potential impressed across the resistor 11 connected between the control electrode 9 and the cathode 5 of the electric discharge device.

When the cold cathode electric discharge device 13 is deenergized the current transmitted through the resistor 11 in its principal circuit is small, the cathode 5 of the hot cathode electric discharge device 3 is substantially at the potential of the control electrode and the electric discharge device is deenergized. As the potential impressed between the cathode 5 and the control electrode 9 is varied by reason of the variation of the current output of the cold cathode electric discharge device 13, the phase relationship of the two control potentials and the principal potential of the hot cathode electric discharge device 3 is varied. The point in the half cycle of positive principal potential at which the cold cathode electric discharge device 3 becomes energized is, therefore, varied and the current output of the electric discharge device is varied.

The condition of excitation of the cold cathode electric discharge device 13 is dependent on the variations in the phase relationship and in the magnitude of the potentials impressed between its principal electrodes 15 and 17 and between its control electrode 29 and its principal electrodes 15 and 17. A resistor 31 is connected between the cathode 15 and the control electrode 29 of the electric discharge device 13 while an inductor 33 is connected between the anode 17 and the control electrode 29. An additional resistor 35 of comparatively high magnitude is connected between the junction-point 37 of the former resistor 31 and the inductor 33 and the control electrode 29. The anode 39 of a photo-sensitive device 41 is connected directly to the anode 17 of the electric discharge device 13 while the cathode 43 of the photo-sensitive device 41 is connected directly to the control electrode 29 of the electric discharge device. The photo-sensitive device 41 is normally maintained in energized condition by a collimated beam of radiant energy that is reflected to the cathode by a small mirror 45 suitably disposed.

The control system is provided with an instrument 47 such as a millivoltmeter that is disposed adjacent to the mirror 45. The instrument is equipped with a movable arm 49 provided with a reflecting surface 51. As the reflecting surface 51 is motivated in the region of the beam of radiant energy it first reflects the beam to the cathode 43 of the photo-sensitive device 41 in varying degrees through a slot 53 of proper structure, and after it has been motivated to a predetermined position, it deflects the radiations entirely away from the photo-sensitive device.

The arm 49 of the instrument 47 is motivated by the action of a coil 55 that is, in turn, energized from a thermo-couple 57, the hot junction 59 of which is disposed in the region to be heated and the cold junction 61 of which is maintained at a predetermined low temperature. As long as the temperature of the region to be heated is below a predetermined point, the photosensitive device 41 remains energized, the electric discharge device 13 to which the photo-sensitive device is coupled remains energized, and the electric discharge device 3 whereby the heating element 1 of the region is energized also remains energized. When the temperature of the region under control attains a predetermined minimum value, the beam of radiant energy is reflected by the reflector 51 away from the photo-sensitive device 41, the photo-sensitive device is deenergized and the heating element of the region is correspondingly deenergized.

The instrument 47 is equipped with a fixed contact 62 that is connected to an intermediate tap 63 of the resistor 35 connected directly to the control electrode 29 of the cold cathode electric discharge device 13. The movable element 49 of the instrument 47 is connected to the junction point 37 of the resistor 31 that is connected to the cathode 15 of the electric discharge device 13 and the inductor 33 connected to the anode 17. If it should happen, for any reason at all, that the motivating coil 55 of the instrument 47 should become incapacitated, as for example, by the burning out of the thermo-couple 57 the movable element will be reverted to its initial position by a clock spring 65 secured thereto, and the element 49 will engage the contact element 62. By the engagement of the movable element 49 and the contact 62, a portion of the resistor 35 to which the movable element and the contact element are coupled is shunted out.

I have found that for a predetermined potential impressed between the anode 17 and the cathode 15 of the electric discharge device 13 with which the photo-sensitive device 41 is associated, the resistor 35 connected directly to the control electrode 29 must have at least a predetermined magnitude for the proper operation of the electric discharge device. Under normal circumstances the resistor 35 is maintained of such magnitude that the electric discharge device 13 remains energized as long as the photo-sensitive device 41 is energized. However, if it should happen as in the present case that a portion of the resistor 35 is shunted out by the engagement of the movable element 49 of the instrument 47 with the contact 62, the electric discharge device is deenergized and remains deenergized in spite of the condition of the photo-sensitive device 41.

It is seen that as long as the thermo-couple 57 remains in normal operative condition, the difference of temperature between the cold junction 61 and the region to be controlled is sufficient to maintain the movable element 49 disengaged from the contact 62 and, therefore, to maintain the system remains completely operative. However, when the thermo-couple 57 burns out the operation of the system is immediately interrupted. By the engagement of the movable element 49 and the contact 62 the cold cathode electric discharge device 13 is deenergized and the electric discharge device coupled to the heating element 1 is prevented from supplying power to the heating element.

It is to be kept in mind that in the absence of the protective feature described hereinabove the burning out of the thermo-couple 57 would result very often in the destruction of the heating element 1 of the region. When the thermo-couple 57 burns out the movable element 49 of the instrument 47 does not respond to the temperature of the region to properly interrupt the beam of radiant energy when the temperature attains the desired point, and for this reason, in the absence of the protective feature the energy continues to be supplied to the heating element indefinitely and the temperature continues to rise until the heating element is destroyed, or at least until any material, such as glass, for example, which is being heated in the region, is rendered useless.

The continuity in the variation of the current supplied to the heating element 1 when the energy supply is interrupted or initiated is attained by the cooperation of the photo-sensitive device 41 with the other elements of the system shown in Fig. 1. In the systems constructed in accordance with the teachings of the prior art only magnitude control is utilized in regulating the output of an electric discharge device of the type utilized in my improved system. In such apparatus the electric discharge device remains deenergized until the control potential attains a predetermined magnitude. It then abruptly becomes fully energized.

In the systems of the prior art corresponding to the system which I have provided, the electric discharge device coupled to the photo-sensitive device remains deenergized until the illumination impinging on the photo-sensitive device attains a predetermined value. It then abruptly becomes energized and delivers its maximum current output. The same situation occurs when the illumination impinging on the photo-sensitive device is decreased and the electric discharge device is deenergized. It is seen that one of the principal difficulties which arises from such operation of a control system is that by reason of the sudden supply of heating energy to the heating element of the region after the region has attained approximately the temperature desired in the region tends quickly to rise to a higher temperature than is desired and when it falls in temperature it tends to fall suddenly to a lower temperature than is desired. In consequence thereof, the temperature desired is not attained but the temperature-time function of the region has a hunting characteristic.

In my improved system this difficulty is suppressed. As the movable reflector 51 of the instrument 47 is motivated in the region of the beam of radiant energy the slot 53 disposed in the path of the beam gradually cuts off the illuminating flux impinging on the cathode 43 of the photo-sensitive device 41. The effect of the gradual variation in the illumination can be seen from the graphs and vector diagrams shown in Figs. 3 to 5. For convenience it will be desirable to consider these views with the thought in mind that the radiation impinging on the photo-sensitive device 41 is being increased rather than decreased.

Figure 3:
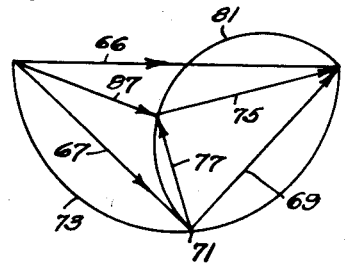
Fig. 3 is a vector diagram representing the condition of a system constructed in accordance with my invention when the photo-sensitive device is deenergized.
Figure 4:
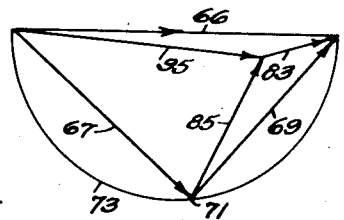
Fig. 4 is a vector diagram showing the condition when the photo-sensitive device is energized.

In the vector diagrams shown in Figs. 3 and 4 the potential impressed between the anode 17 and the cathode 15 of the cold cathode electric discharge device 13 may be represented by a horizontal vector 66. The potential impressed across the network comprising the resistor 31 and the inductor 33 connected in series may be represented by two vectors 67 and 69 in quadrature with each other, the sum of which is equal to the vector 66 representing the potential impressed between the anode 17 and the cathode 15. It is apparent that the intersection point 71 of the vectors 67 and 69 will lie on the circumference 73 of a circle, the diameter of which is the vector 66 representing the principal potential.

When the photo-sensitive device 41 is in an unenergized condition it is substantially, in its electrical properties, equivalent to a capacitor and the potentials impressed across it and the resistor 35 connected directly to the control electrode 29 may be represented by two vectors 75 and 77 at right angles to each other, the sum of which is equal to the vector 69 representing the potential impressed across the inductor 33. It is apparent that the point of intersection 79 of the two vectors 75 and 77 last considered will also lie on the periphery 81 of a circle, the diameter of which is the vector 69 representing the potential impressed across the inductor.

As the illumination impinging on the photo-sensitive device 41 is gradually increased from zero to its maximum value, the photo-sensitive device changes in character from a capacitor to a combined capacitor and resistor, and the phase lag of the potential impressed across it relative to the potential impressed across the inductor 33 is decreased. The situation may be represented by a vector system such as is shown in Fig. 4 in which, as can be seen, the vector 69 representing the potential impressed across the inductor 33 is still equivalent to the sum of the vectors 83 and 85 representing the potentials impressed across the photo-sensitive device 41 and the resistor connected to the control electrode 29, but the vectors 83 and 85 are no longer at right angles to each other.

In the system representing the condition when the photo-sensitive device 41 is unenergized the potential impressed between the cathode 15 and the control electrode 29 is represented by a vector 87 extending from one terminal of the vector 66 representing the principal potential to the intersection point 79 of the two vectors 75 and 77 representing the potential impressed across the photo-sensitive device 41 and across the resistor 35 connected to the control electrode 29. The vector 87 lags behind the vector 66 representing the principal potential by a considerable angle and, consequently, the control potential is considerably out of phase with the principal potential.

Figure 5:
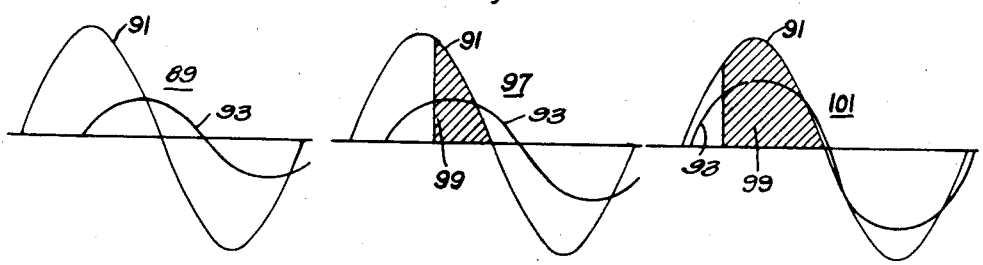
Fig. 5 is a diagram showing the relationship between a successive series of impulses transmitted through the electric discharge device as the illumination impinging on the photo-sensitive device is varied.

The corresponding situation existing in the electric discharge device 13 is represented by the lefthand graph 89 of Fig. 5. In this graph the curve 91 having the greatest amplitude represents the principal potential, and the curve 93 having the smaller amplitude represents the control potential. The relative magnitudes of the principal potential and the control potential are such that the electric discharge device is deenergized. This condition is, of course, the existing condition when the reflector 51 is so positioned that the photo-sensitive device is unilluminated.

If the movable reflector 51 of the instrument 47 should now be considered to have arrived at such a position that a portion of the illumination impinges on the photo-sensitive device 41 the vector 95 representing the potential impressed between the cathode 15 and the control electrode 29 will be rotated in a clockwise direction and will be increased in magnitude as shown in Fig. 4. This situation is represented by a graph such as the central graph 97 of Fig. 5.

For illuminating flux of small magnitude impinging on the photo-sensitive device 41 the increase in the amplitude of the control potential will be small and the decrease in the phase-difference between the anode-cathode and the control electrode cathode potentials will also be comparatively small. If the illumination impinging on the photo-sensitive device is of sufficient magnitude, however, the combined effect of the increase in amplitude and the decrease in phase lag of the control potential will be sufficient magnitude to cause the electric discharge device 13 to become energized near the half-way point in the positive half-cycle of principal potential and, consequently, the electric discharge device will transmit current for a quarter cycle of the potential impressed on the principal electrodes as shown by the shaded portion 99 of the central graph 97 of Fig. 5. If the illumination impinging on the photo-sensitive device 41 is still further increased, the amplitude of the control potential is increased and its phase lag is further decreased. By reason of this condition, the excitation of the electric discharge device 13 now occurs nearer to the beginning of the positive half-cycle of potential as shown in the right-hand graph 101 of Fig. 5 and the current transmitted by the electric discharge device is correspondingly increased.

Figure 2:
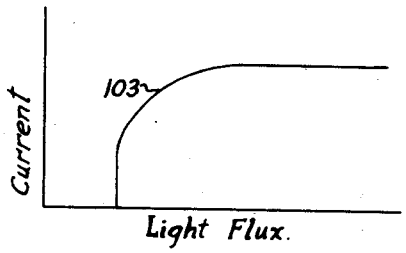
Fig. 2 is a graph showing the variation in the current output of the electric discharge device utilized in my apparatus as the light intensity impinging on the associated photo-sensitive device is varied.

It is seen that by reason of the combined effect of the phase-shift variation and the magnitude variation, the increase in current transmitted by the electric discharge device 13 is not abrupt but is, to a certain extent, continuous. The minimum current transmitted is substantially that attained when the electric discharge device transmits current during the last positive quarter-cycle of principal potential and the maximum current transmitted is equivalent to the current transmitted by the electric discharge device substantially during the whole positive half-cycle of principal potential. The situation which exists in the electric discharge device when it is being energized or deenergized can be best represented by a curve 103 such as is shown in Fig. 2. As can be seen from the curve 103 as the light impinging on the photo-sensitive device 41 is increased the current transmitted through the electric-discharge device is gradually increased from a predetermined value representing the minimum energized condition to the maximum value representing the maximum energized condition.

The cold cathode electric discharge device 13 controls the phase relationship between the principal potential and the control potential of the electric discharge device 3 that supplies energy to the load. Consequently, the energy supplied to the load by the hot cathode electric discharge device 3 varies in a manner corresponding to the variation of the current transmitted by the cold cathode electric discharge device 13.

In the present application only one embodiment of my invention has been illustrated. It is apparent that this embodiment may be modified in a number of ways without producing any essential change in the essence of my invention.

Thus, in the system shown, the magnitude of the excitation of the electric discharge device 13 is a direct function of the magnitude of the excitation of the photo-sensitive device 41. It is apparent that the excitation of the electric discharge device may also be an inverse function of the excitation of the electric discharge device. In a system of this type the inductor 33 and the resistor 31 connected in series therewith are inter-changed and the anode 39 of the photo-sensitive device 41 is connected to the control electrode 29, of the electric discharge device 13 while the cathode 43 of the photo-sensitive device is connected to the cathode 15 of the electric discharge device.

The electric discharge devices 3 and 13 described hereinabove as utilized may be replaced by other electric discharge devices. Thus, the cold cathode electric discharge device 13 may be replaced by a mercury pool device or by a hot-cathode gas-filled electric discharge device or again by a high vacuum hot cathode electric discharge device. And so also the hot cathode electric discharge device 3 may be replaced by a high vacuum electric discharge device, by a mercury pool device of the type incorporating a make-alive electrode or by a mercury pool device of the type incorporating a keep-alive electrode.

Mercury pool devices of the former type have recently been developed and are known as Ignitron tubes. They incorporate a mercury pool, a graphite anode and a make-alive electrode of carborundum, boron, or other suitable material which dips into the mercury pool and through which a heavy current is transmitted during the starting operation.

In a particular system of the type that I have found highly useful the cold cathode electric discharge device 13 is the Westinghouse KU-618. A potential of 440 volts alternating current is impressed between its principal electrodes 15 and 17. The resistor 31 connected to the cathode 15 is of the order of 40,000 ohms. The resistor 35 connected to the control electrode 29 is of the order of 100 megohms. The inductor 33 connected to the anode 17 is of the order of 1300 henries and has a reactance of 4200 ohms. The photo-sensitive device 41 is of the type known as the Westinghouse SR-50. The fixed contact 62 of the instrument 47 is connected to such a point 63 on the resistor 35 that when the movable element 49 of the instrument 47 engages the contact 62, 90 megohms of resistance are shunted out. I have found that when this situation occurs regardless of the illumination impinging on the photo-sensitive device 41 the electric discharge device fails to become energized.

In the system that I have found to operate satisfactorily the hot cathode electric discharge device 3 is of the type known as the Westinghouse KU-610. I have recently also found that the KU-627, and the KU-628 tubes will operate satisfactorily and in certain situations I have found that these tubes may be operated directly from the photo-sensitive device 41 without the aid of the intervening cold cathode device 13. The potential impressed between the anode 7 and the cathode 5 of this device is generally of the order of 440 volts. The capacitor connected between the control electrode 9 and the anode 7 of the device has a magnitude of .04 microfarads. The resistor 12 connected directly to the control electrode 9 has a magnitude of 3 megohms and the resistor 11 connected between the cathode 5 and the former resistor 12 has a magnitude of 1500 ohms. The magnitude of the other elements in the system is not essential. The load is of the type drawing a current of the order of one-half ampere.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination, an instrument having a movable element and means for motivating said movable element to a plurality of successive positions and for maintaining said motivating means energized to maintain said movable element in one of said positions, an electric discharge device having a control electrode and a plurality of principal electrodes, means, including means for impressing potentials between said control electrode and said principal electrodes and between said principal electrodes, for normally maintaining said electric discharge device energized, means to be actuated by said movable element when it is in a position corresponding to the excitation of said motivating means that is greater than a predetermined minimum excitation, for varying the potentials impressed between said control electrode and said principal electrodes to deenergize said electric discharge device and means to be actuated by said movable element when said motivating means is deenergized for impressing potentials between said principal electrodes and said control electrode to deenergize said electric discharge device.

2. In combination an instrument having a movable element and means for motivating said movable element to a plurality of successive positions and for maintaining said element in any of said positions, means for normally maintaining said motivating means energized to maintain said movable element in one of said positions, an electric discharge device having a control electrode and a plurality of principal electrodes, means, including means for impressing potentials between said control electrode and said principal electrodes and between said principal electrodes, and a normally energized photo-sensitive device coupled between said control electrode and one of said principal electrodes for normally maintaining said electric discharge device energized, means, to be actuated by said movable element when it is in a position corresponding to excitation of said motivating means that is greater than a predetermined minimum excitation, for deenergizing said photo-sensitive device thereby to deenergize said electric discharge device, and means to be actuated by said movable element when said motivating means is deenergized for deenergizing said electric discharge device while said photo-sensitive device is energized.

3. In combination, an instrument having a movable element and means for motivating said movable element to a plurality of successive positions and for maintaining said element in any of said positions, means for normally maintaining said motivating means energized to maintain said movable element in one of said positions, an electric discharge device having an anode, a cathode and a control electrode, means, including means for impressing potentials between said control electrode and said anode and cathode and between said anode and cathode, and a normally-energized photo-sensitive device coupled between said control electrode and said anode for normally maintaining said electric discharge device energized, means to be actuated by said movable element when it is in a position corresponding to excitation of said motivating means that is greater than a predetermined minimum excitation, for deenergizing said photo-sensitive device thereby to deenergize said electric discharge device, and means to be actuated by said movable element when said motivating means is deenergized for deenergizing said electric discharge device while said photo-sensitive device is energized.

4. In combination an instrument having a movable element and means for motivating said movable element to a plurality of successive positions and for maintaining said element in any of said positions, means for normally maintaining said motivating means energized to maintain said movable element in one of said positions, an electric discharge device having an anode, a cathode and a control electrode, means, including means for impressing potentials between said control electrode and said anode and cathode and between said anode and cathode, impedance means connected between said control electrode and said anode and cathode, and a normally energized photo-sensitive device coupled between said control electrode and one of said principal electrodes for normally maintaining said electric discharge device energized, means to be actuated by said movable element when it is in a position corresponding to excitation of said motivating means that is greater than a predetermined minimum excitation, for deenergizing said photo-sensitive device to deenergize said electric discharge device, and means to be actuated by said movable element when said motivating means is deenergized for shunting out a portion of said impedance means to deenergize said electric discharge device while said photo-sensitive device is energized.

5. In combination, an instrument having a movable element and means for motivating said movable element to a plurality of successive positions and for maintaining said element in any of said positions, means for normally maintaining said motivating means energized to maintain said movable element in one of said positions, an electric discharge device having an anode, a cathode and a control electrode, means, including means for impressing potentials between said control electrode and said anode and cathode and between said anode and cathode, a resistor connected between said control electrode and said anode and cathode, and a normally energized photo-sensitive device coupled between said control electrode and one of said principal electrodes for normally maintaining said electric discharge device energized, means to be actuated by said movable element when it is in a position corresponding to excitation of said motivating means that is greater than a predetermined minimum excitation, for deenergizing said photo-sensitive device to deenergize said electric discharge device, and means to be actuated by said movable element when said motivating means is deenergized for shunting out a portion of said resistor to deenergize said electric discharge device while said photo-sensitive device is energized.

6. In combination, an electric discharge device having an anode, a cathode and a control electrode, immersed in a gaseous medium, an alternating power supply source, means for connecting the terminals of said source to said anode and cathode, a network including an inductor and a resistor connected in series, means for connecting the terminals of said network to said anode and cathode, means, including another resistor, for connecting the junction point of said inductor and said first-named resistor to said control electrode, a photo-sensitive device having the property of a combined resistor and capacitor connected between said anode and said control electrode of said electric discharge device to control the excitation thereof, and means for shunting out a portion of said second-named resistor thereby to deenergize said electric discharge device regardless of the condition of said photo-sensitive device on the happening of a predetermined contingency.

JOSEPH F. KOVALSKY.